W. R. SEIGLE.
BRAKE OR CLUTCH BAND LINING.
APPLICATION FILED JUNE 28, 1920.
1,395,743.  Patented Nov. 1, 1921.
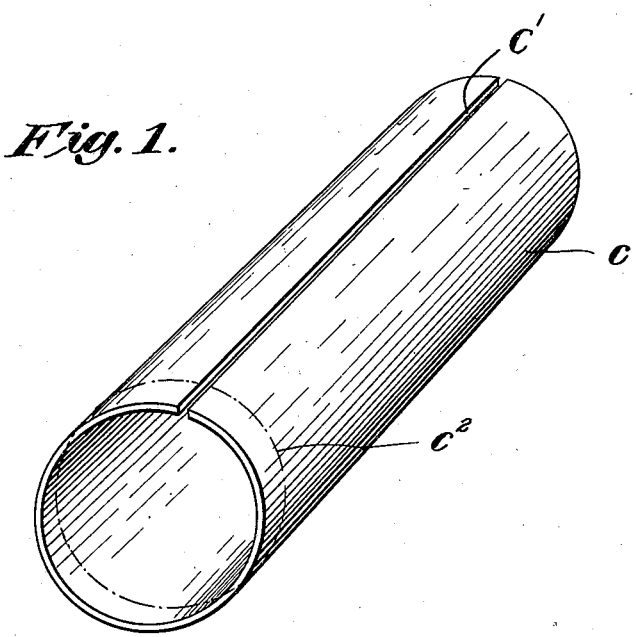
Fig. 1.
Fig. 2.
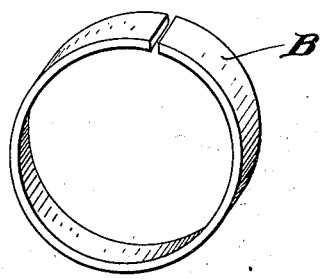
Fig. 3.
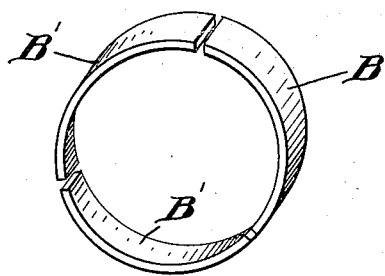
Inventor
William R. Seigle
by Roberts, Roberts & Cushman
his Attorneys

UNITED STATES PATENT OFFICE.

WILLIAM R. SEIGLE, OF NEW YORK, N. Y.

BRAKE OR CLUTCH BAND LINING.

1,395,743.     Specification of Letters Patent.     Patented Nov. 1, 1921.

Application filed June 28, 1920. Serial No. 392,373.

*To all whom it may concern:*

Be it known that I, WILLIAM R. SEIGLE, a citizen of the United States of America, and resident of New York, in the county of New York and State of New York, have invented new and useful Improvements in Brake or Clutch Band Linings, of which the following is a specification.

My invention relates to linings or friction-bands for friction brakes and the like, and consists in a new lining of compactly felted fibrous material in segmental or curved form. In order to serve effectively for the purpose indicated, the brake linings should be composed chiefly, if not wholly, of heat-resistant fiber, such as asbestos fiber, and should also be impregnated as thoroughly and uniformly as possible with a binding material which integrates the fibers of the structure, increases the capacity of the band to resist wear, and produces a wearing surface having a coefficient of friction suitable to the service to which the brake lining is devoted.

It has been the practice for many years to construct brake-linings and friction clutch rings of molded or felted asbestos fiber bodies, impregnated with sundry cementitious binders, such as rubber compositions, linseed oil, etc., as well as to make such linings and rings of woven asbestos fabric, similarly impregnated, and also to reinforce the fibrous basis of such articles of manufacture with wire, woven with the asbestos filaments in the fabric articles, or with fragments of metal, such as wire, interspersed among the asbestos and other fibers in the molded or felted articles. Flat friction clutch rings have also been made from asbestos mill-board, which is essentially a laminated structure, built up of felted webs of asbestos fiber, fabricated in a paper machine. These, being more homogeneous in their constitution than woven fabrics, possess, like flat asbestos fiber rings molded *en bloc*, in a press, structural advantages with reference to the purposes to which they are applied.

It has been proposed, also, to make curved segmental brake linings by bending flat asbestos mill-board to curved shape upon forms while the mill-board is soft and wet, but a mill-board of thickness suitable for brake-band purposes loses its valuable property of homogeneity when subjected to this treatment; the fibers lying on or near the convex surface of the lining are irregularly drawn asunder and break in many places, while those lying in or near the concave surface of the lining are wrinkled or irregularly condensed.

Molding segmental blocks of asbestos fiber has been practically successful provided the blocks are thick enough or short enough, circumferentially measured, to make this method suitable. So far as I am aware, the direct molding method has not been applied to the manufacture of segmental linings of the proportions suited to automobile brakes, nor do I believe that such linings can be successfully made by the method of molding *en bloc* in filter molds.

The method by which I prefer to make my improved curved or segmental brake linings and the like, is characterized by cumulatively building, by the layer-accretion method, a fibrous felted or paper structure in cylindrical form, of radius approximately the same as that of the brake drum to which the lining is to be applied, allowing the felted fibrous cylinder to set in the form in which it was made, and subsequently cutting the segmental linings from the cylinder. Layer-accretion cylinders of fibrous material can be made for the purpose in the same manner as mill-board, but I prefer to manufacture these cylinders by a method and on a machine which I have invented (and which form the subject matter of applications for patent filed my me concurrently herewith, serially numbered 392,371, and 392,372); for the reason that the laminated structure of mill-board as ordinarily manufactured introduces an element of heterogeneity or irregularity in the completed article which should be avoided if possible, if the product is to be subjected to abrasion.

In the drawings hereto annexed, which illustrates the product of my method, and certain stages of the method itself—

Figure 1 represents, in perspective, a longitudinally slit cylinder composed of felted fibrous material, such as asbestos fiber;

Fig. 2 represents, in perspective, a band, cut from a cylinder such as shown in Fig. 1; and Fig. 3 represents in perspective, three segments, cut from a band such as shown in Fig. 2.

The fibrous material, such as short-staple asbestos fiber, with or without mixture with other fibers, is formed into a thin web, in a paper machine of any suitable type, and then wound upon a cylinder, successive layers of the thin web incorporating with or adhering to each other, as the layers superpose one on the other. The cylinder on which the web is thus wound should preferably be of approximately but not exactly the same radius as the brake drum to which brake-linings made of the felted fiber structure are eventually to be applied. According to whether the brake band is to be applied externally or internally to the brake-drum, the radius of the cylinder on which the fibrous mat or board is formed should preferably, be either greater or less, to a slight degree, than the radius of the brake drum, so that when set and finished, the brake band shall require a little bending in order to bring its radius into identity or conformity with that of the brake drum.

When the felted fibrous cylinder has been built up by layer-accretion in the manner indicated to the desired thickness, it is allowed to dry and set in its original cylindrical form. No matter how thick the wall of this cylinder may be, it preserves unimpaired all the elements of strength due to the interlaced or felted disposition of the fibers of which it is the main or wholly composed, and is substantially homogeneous, and of uniform density throughout. Such a sheet is distinguished from molded curvilinear blocks, made by pressing a mass of fibrous material intermixed with a suitable binder, in a mold, in that the curved-surfaced sheet is a layer-accretion product endowed with tensile strength in the aggregate equal to or greater than the arithmetical sum of the tensile strengths of the accumulated single layers or web-accretions, and consequently having a strength to resist bending out of its original curved form, imparted to it by the cylindrical or other curved body (such as a mandrel or winding cylinder) on which it was formed while in the wet or "green" condition. Moreover, the layer-accretion method of construction is capable of producing bodies of complete cylindricity, whereas the method of molding fibrous bodies *en bloc* is limited to arcuate forms of relatively small subtended angle. Thus, the curved-surfaced sheet is of uniform density or compactness of fiber-assemblage, from one curved side to the other; if and when employed as a brake lining, a segment cut from such a curved sheet will present to the abrading body—such as a brake-drum—surfaces of uniform character, no matter how much the substance of the brake lining is worn away in service.

When the curved-surfaced sheet has acquired the desired thickness by layer-accretion upon the form or mandrel, it will preferably be retained on the form until it has dried and set to a firm, hard consistency. Then it is slit longitudinally and drawn endwise from the form. The product at this stage of manufacture is illustrated in Fig. 1, where C represents the curved-surfaced sheet of layer-accretion structure, divided at C'. The dotted line C² represents the line where the cylindrical sheet may be cut to form a narrow band. Fig. 2 represents such a band, designated by the letter B. If the product is designed to provide brake linings for external application to a brake-drum, the radius of the original, uncut cylinder of felted fibrous material will preferably be a little greater than the radius of the brake drum. A band, such as B, which comprises substantially the full circumference of the original cylinder, may be used as the lining of a single, flexible brake shoe, embracing the full circumference of the brake-drum, and the band B will be shortened or trimmed at one end, so as to have a segmental length only a little shorter than the circumference of the brake-drum. Then, when the parts are assembled in the usual manner, the resiliency of the brake band B will always tend to relax the band from contact with the drum, and thus minimize, if not wholly eliminate, dragging of the brake on the drum at times when brake-service is not required.

If the brake is to be divided into several segments, the band B may be cut into segments such as B', Fig. 3, and these segments will be trimmed to the proper length for adjustment to the brake-drum.

When it is intended to employ the brake linings internally, to a brake drum, the radius of the form on which the original layer-accretion sheet of fibrous material is built, and consequently the radius of the lining, will be a little less than the internal radius of the brake-drum, so that the resiliency of the brake-lining material will tend always to draw the lining away from the drum-surface, and thus minimize or eliminate undesirable dragging of the brake.

I claim:

1. Brake or clutch lining, the body of which consists of a curved-surfaced band of felted fibrous material of layer-accretion construction, in which the original curvature of formation is preserved.

2. Brake or clutch lining, the body of which consists of a curved-surfaced band of felted fibrous material of layer-accretion construction, characterized by uniform fiber-density from the concave to the convex surface.

3. Brake or clutch lining, the body of which consists of a curve-surfaced band of felted fibrous material of layer-accretion construction, in which the original curvature of formation is preserved, the radius of curvature of said band being different in length from the radius of the brake drum to which it is to be applied.

4. Brake or clutch lining, the body of which consists of a curvey-surfaced band of felted fibrous material of layer-accretion construction, characterized by uniform fiber-density from the concave to the convex surface, the radius of curvature of said band being different in length from the radius of the brake drum to which it is to be applied.

Signed by me at New York, N. Y, this 25th day of June, 1920.

WILLIAM R. SEIGLE.